United States Patent [19]
Condit et al.

[11] Patent Number: 5,938,823
[45] Date of Patent: Aug. 17, 1999

[54] INTEGRATED ELECTROSTATIC COLLECTION AND MICROWAVE STERILIZATION FOR BIOAEROSOL AIR PURIFICATION

[75] Inventors: David A. Condit, Avon; Timothy N. Obee, South Windsor; Willard H. Sutton, Glastonbury; Richard R. Grzybowski, Plantsville; Christopher M. Pater, Colchester; Antonio Rinaldi, Wethersfield; Sunita Satyapal, East Hampton; Wayde R. Schmidt, Pomfret Center; Charles R. Winston, Glastonbury; Michael Winter, New Haven, all of Conn.

[73] Assignee: Carrier Corporation, Farmington, Conn.

[21] Appl. No.: 08/844,141

[22] Filed: Apr. 18, 1997

[51] Int. Cl.$^6$ ........................................... B03C 3/47
[52] U.S. Cl. .................... 96/16; 96/25; 96/69; 96/98; 96/224; 96/225; 422/121
[58] Field of Search ................... 96/16, 69, 96, 96/99, 223–225, 25, 98; 95/73, 78; 422/21, 22, 121

[56] References Cited

U.S. PATENT DOCUMENTS

| | | |
|---|---|---|
| 2,418,339 | 4/1947 | Ehrgott .................................. 96/224 X |
| 2,709,954 | 6/1955 | Baker ....................................... 96/16 X |
| 3,744,216 | 7/1973 | Halloran ...................................... 96/16 |
| 3,798,879 | 3/1974 | Schmidt-Burbach et al. .............. 96/16 |
| 4,102,654 | 7/1978 | Pellin ......................................... 96/16 |
| 4,203,948 | 5/1980 | Brundbjerg ............................. 422/121 |
| 4,227,899 | 10/1980 | Meny et al. ............................. 96/223 |
| 4,354,861 | 10/1982 | Kalt .......................................... 96/69 |
| 4,661,126 | 4/1987 | Inagami et al. ....................... 96/225 X |
| 4,707,167 | 11/1987 | Saito et al. ............................... 96/225 |
| 5,225,167 | 7/1993 | Wetzel ...................................... 96/224 |
| 5,433,772 | 7/1995 | Sikora ......................................... 96/87 |
| 5,492,557 | 2/1996 | Vanella ........................................ 96/16 |

*Primary Examiner*—Richard L. Chiesa

[57] ABSTRACT

Air cleansing apparatus includes an electrostatic precipitator in which the collector plates are made of, for instance, reticulated chemical vapor deposited silicon carbide, or reticulated silicon carbide ceramic coated with titanium nitride, zirconium diboride, or chemical vapor deposited silicon carbide. Microorganisms entrained on the collector plates are thermally degraded or vaporized by microwave radiation directed against the plates during a sterilization period which follows a collection period.

12 Claims, 2 Drawing Sheets

INTEGRATED ELECTROSTATIC COLLECTION AND MICROWAVE STERILIZATION FOR BIOAEROSOL AIR PURIFICATION

TECHNICAL FIELD

This invention relates to deactivating and/or thermally degrading or vaporizing bioaerosols which are electrostatically precipitated, thereby to cleanse indoor air.

BACKGROUND ART

Bioaerosols include microorganisms such as bacteria, viruses and fungi contained in airborne water droplets or adsorbed onto solid particulate and airborne particles such as mold spores or dander. Removal of bioaerosols from enclosed spaces is an important indoor air quality objective in many applications, including ducted heating, ventilating and air conditioning (HVAC) systems such as commercial and residential buildings, hospitals and health care facilities, as well as aircraft and spacecraft enclosures. Prior techniques for cleaning indoor air generally employ one of four basic methods: physical impaction (filters) or electrically assisted capture (electrostatic precipitators) of particulate matter, absorption of gaseous pollutants onto solid sorbents, and chemical reaction such as ozonation to consume gaseous contaminants. Of these four methods, physical impaction and electrically assisted capture have commonly been used for the removal of bioaerosols. However, microbes collected by these methods remain viable, and reentrainment into the air stream is only avoided by periodic maintenance; specifically, filter replacement and cleaning of the electrostatic collector plates.

DISCLOSURE OF INVENTION

Objects of the invention include effective removal of bioaerosols from the air of enclosed spaces, and removal of bioaerosols from air without the requirement of interventional maintenance.

In accordance with the present invention, a collector plate for an electrostatic precipitator has outer surfaces which are electrically conductive and absorb microwaves. In accordance further with the present invention a collector plate for an electrostatic precipitator comprises a substrate coated with a microwave absorbing material which is electrically conductive, such as titanium nitride or zirconium diboride. The substrate may be reticulate silicon carbide ceramic composite, or other open pore ceramic or ceramic composite, such as oxide bonded silicon carbide, or the substrate may be metal.

According to the present invention a microwave absorbing collector plate of an electrostatic precipitator serves as a heat generator for heating captured particulate matter sufficiently to sterilize and/or disinfect microorganisms. In accordance with the invention, air to be cleansed is passed through the electrostatic precipitator to trap the particulates in a conventional way, with the cleansed air flowing to an enclosed space; periodically, the collection plates are heated with microwave energy to kill all the trapped microbial matter. In one embodiment, the heating takes place with no air flow. In another embodiment, the air stream is vented to the outside during heating to ensure that no microbial fragments (endotoxins) or gaseous decomposition products pollute the enclosed space. In one embodiment of the invention, the collection plates are pulsed with microwave energy to allow time for heat conduction to provide a more uniform elevated temperature across the plate surface. The invention may be practiced with various plate/stream/microwave configurations.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
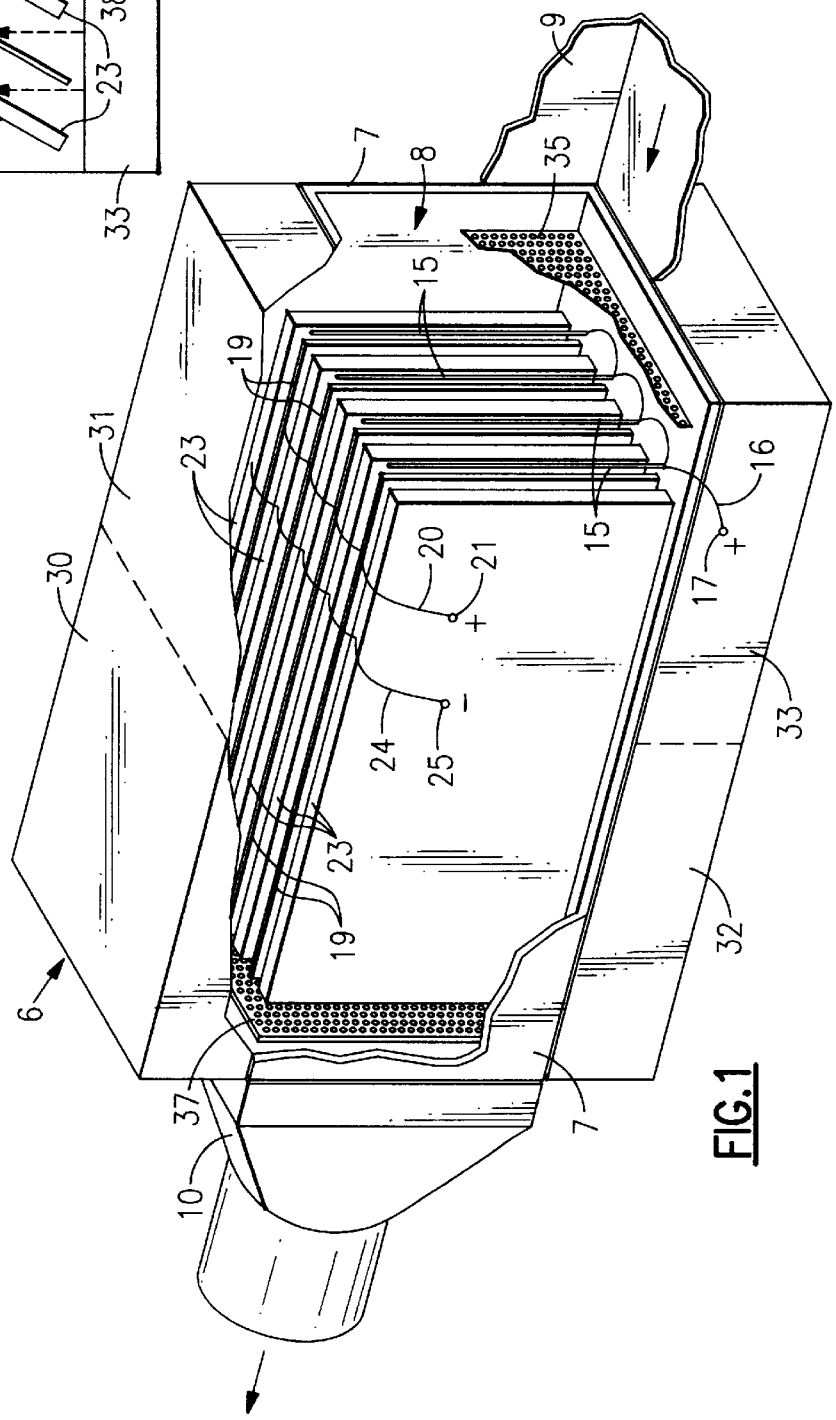
FIG. 1 is a simplified, partially broken away perspective view of one embodiment of apparatus which incorporates the present invention.

Referring to FIG. 1, apparatus 6 for cleansing air incorporating the present invention comprises a plurality of walls 7 defines an air flow chamber 8 which receives air from a duct 9 and delivers air through a transition duct 10 to a suction pump 11. The air in the duct 8 is typically drawn from an enclosed space, as described hereinbefore. Within the chamber 8, an electrostatic precipitator comprises a plurality of ionizing wires or rods 15 which are connected by wiring 16 to a source 17 of positive voltage, a plurality of deflector plates 19, aligned in the air flow with the ionizing wires or rods 15 and also connected by wiring 20 to a source of positive voltage 21, and a plurality of collector plates 23 disposed on each side of the deflector plates 19 and connected by wiring 24 to a source of negative potential 25. Particles entrained in the air stream flowing through the chamber 8 become positively charged in the ionizing corona surrounding the ionizing wires or rods 15. The particles are repelled from the positive deflector plates 19 and attracted to the negative collector plates 23, all in the conventional fashion. Systems of this sort known to the prior art require periodic washing to remove the captured particulates, which include unwanted microorganisms.

According to the invention, the surfaces of the collector plates 23 not only are electrically conductive so as to form electrostatic precipitator collection plates, but also are microwave absorptive (rather than reflective) so as to be able to absorb microwave energy, thus becoming sufficiently hot so as to kill the microorganisms which are captured on the collector plates. In FIG. 1, four conventional microwave sources, each including a conventional magnetron, wave guide, and rotating reflector blades, direct microwave radiation on the top and bottom edges of the collector plates 23. The microwave sources 30–33 may be pulsed (in the same fashion as household microwave ovens) to provide time for heat conduction from the edges toward the central portions of the collector plates 23. In this fashion, depending upon the energy used, the collector plates can be brought to a sterilizing/purifying temperature sufficient to kill substantially all of the microorganisms trapped in the collector plates, in a matter of minutes. In order to contain the microwave radiation within the chamber 8, conventional stamped metal microwave reflecting screens 35, 37 are provided at each end of the chamber 8. The ionizing wires or rods 15, the deflector plates 19 and the collector plates 23 may all be mounted on suitable insulating materials (not shown in FIG. 1 for clarity), such as perfluorinated hydrocarbon materials or other insulators, although quartz is deemed preferred. The wiring 16, 20, 24 may be run within quartz tubing or otherwise provided with high temperature, high voltage, electrical insulation.

According to the invention, the collector plates 23 are formed with a substrate of reticulated silicon carbide ceramic coated with either titanium nitride or zirconium diboride, chemical vapor deposition (CVD) silicon carbide, or other microwave absorptive material. Or, the collector plates may comprise reticulated, chemical vapor deposited silicon carbide (which itself is conductive and microwave absorptive). The ceramic substrate is coarsely porous, and can easily withstand the temperatures (about 500° F.) utilized for killing microorganisms. The coating is sufficiently electrically conductive so that the electrostatic attraction to the collector plates is readily effected, and is also sufficiently absorptive of microwave radiation, rather than being reflective as metal conductors are. The deflector plates 19 may also comprise coated, openly porous ceramics or ceramic composites, such as reticulated silicon carbide ceramic, but they may preferably comprise simple metal plates, such as of copper or aluminum. Other collector plates may be utilized, so long as the surfaces thereof are both sufficiently electrically conductive and microwave absorptive. In the embodiment of FIG. 1, the collector plates could comprise a substrate of metal, such as aluminum, coated with titanium nitride, zirconium diboride, or CVD silicon carbide to render the plate microwave absorptive, rather than microwave reflective.)

Figure 2:
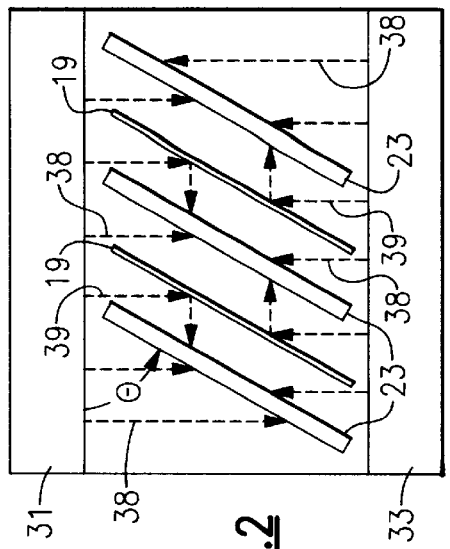
FIG. 2 is a simplified, end elevation view of a variant of the embodiment of FIG. 1 which may be used in practicing the invention.

In the embodiment of FIG. 1, the collector plates and deflector plates are generally planar. However, they can take other shapes that will suit any utilization of the invention. In the embodiment of FIG. 1, the plates are orthogonal with respect to the microwave sources 30–33. However, the plates may be tilted (FIG. 2) at a moderate angle, Θ, (for instance, between 40° and 70°) with respect to the bottom and top of the chamber 8, thereby to allow some of the radiation to impinge directly on the large, side surfaces of the collection plates, as shown in FIG. 2 by the dashed arrows 38, and some of the radiation reflecting off of the deflector plates and onto the collector plates, as shown by the dashed arrows 39 in FIG. 2. The deflection plates must be metal, not coated with microwave absorbing material, so as to reflect the microwave energy.

Figure 3:
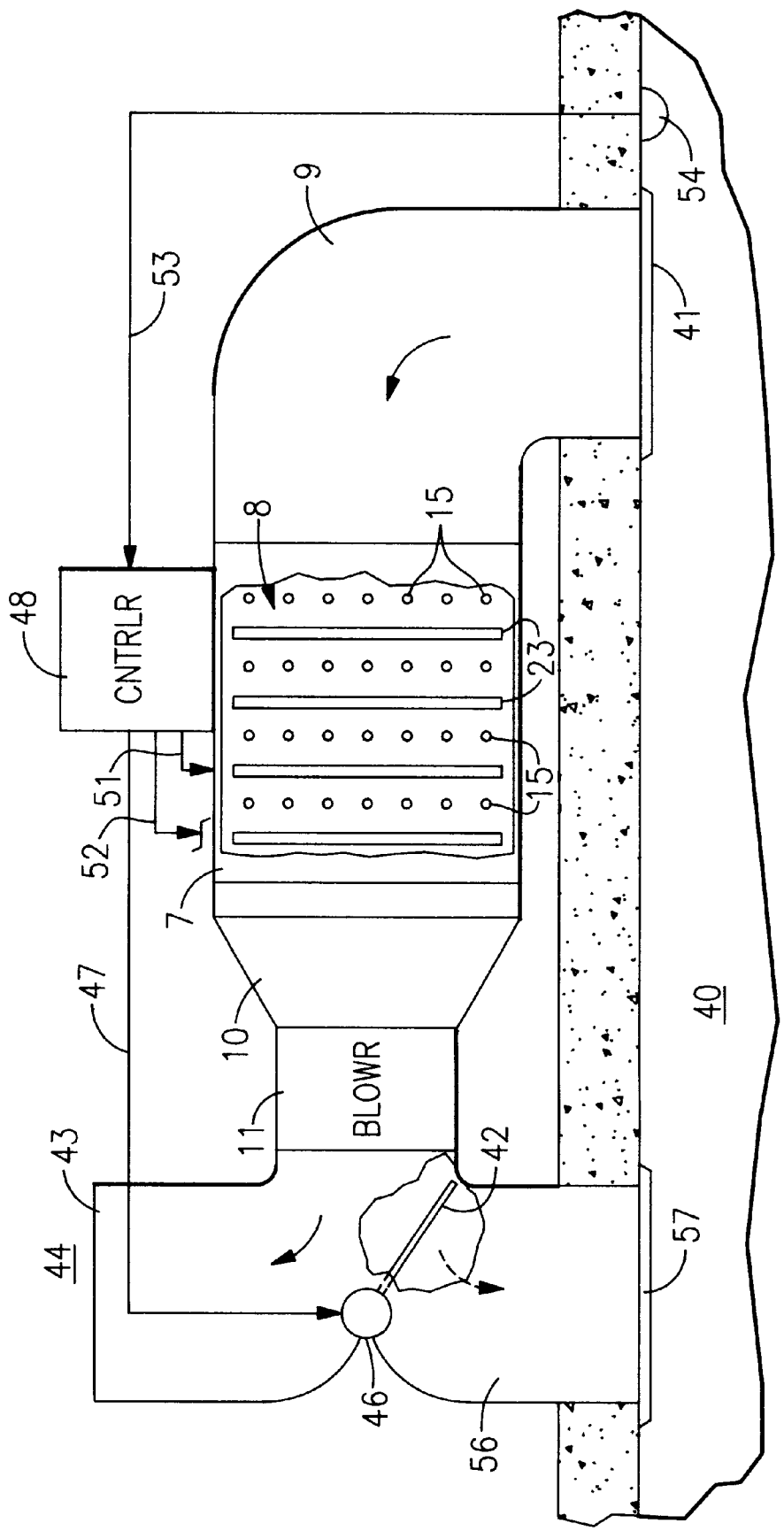
FIG. 3 is a simplified, partially broken away top plan view of another embodiment of apparatus incorporating the present invention.

Referring to FIG. 3, in an alternative embodiment of the invention, the reticulate plates 23 are placed crosswise to the flow of air being cleansed, each being downstream of a corresponding grid of ionizing wires or rods 15, forming a multistage electrostatic precipitator. The reticulate silicon carbide ceramic is sufficiently porous to allow adequate flow when working with an adequate pump. In FIG. 3, the ionizing wires or rods 15 also serve as deflectors, in place of the deflector plates 19 of FIGS. 1 and 2. A multistage precipitator embodiment (as in FIG. 3) may be more effective than a parallel flow embodiment (as in FIG. 1). Of course, the embodiment of FIG. 3 has a higher pressure drop and may require a more powerful air pump.

FIG. 3 illustrates one of several ways in which the invention may be utilized. In FIG. 3, air is being drawn from a room 40 through a duct inlet trim 41 and the duct 9, through the chamber 8, the transition 10 and the suction blower 11. During the collection phase, the diverter 42 directs the flow through the duct 56 (with a diverter 42 turned toward the room 40), through an outlet trim 57 and back into the room 40. During or after the microwave heating phase, the diverter 42 is placed in the position shown in FIG. 3 so as to direct the flow through an exhaust duct 43 to the outside 44. The diverter 42 is operated by a solenoid 46 (or motor or the like) in response to signals on lines 47 provided thereto from a controller 48. The controller 48 also provides the corona voltages to the ionizing wires or rods 15 and the plates 19, 23 over lines 51. The controller also controls the on/off and duty cycle of the microwaves 30–33 with signals on lines 52. The controller is responsive to a signal on a line 53 from an occupancy sensor 54 (which may be a common motion detector) to sense whether the room 40 is occupied, or not. In this embodiment, the air flow and collection of particles may be controlled so as to operate only when the room is occupied, or only when it has been occupied for some time, or the like. The controller can also sense the ending of an occupancy, or it may presume the lack of occupancy, such as by a real time clock in the middle of the night, to control radiation of the collector plates by the microwaves only when the room is not being used. With the diverter as shown in FIG. 3, air is flowing through the system to clear out any microbial fragments (endotoxins) or airborne decomposition products. The air may flow contemporaneously with microwave heating of the collection plates, or the air may flow only after heating of the collection plates is complete.

In other embodiments of the invention, the heating of the collection plates by the microwaves may take place with no air flow, such as in the middle of the night, and the air flow may be turned on only the next time that the room is being used. It has been found that the residue is sufficiently innocuous so that when the room 40 is part of a much larger air volume system (such as an HVAC zone in a commercial building), the residue becomes insignificant. Thus, one mode of operation can be to cause a flow and collect particulates when a room either is or has been in service, heat the particulates to kill them when the room is not in service, with no other cycle events involved.

The invention can also be placed in series with the air flow of an HVAC zone in an obvious fashion. In such a case, the conditioned air will enter the duct 9 from the HVAC system, and be delivered to the room by the duct 56 through an inlet trim 57. The return air will follow its normal path, such as in an above-ceiling plenum. When connected in line with an HVAC, the system may be heated for cleansing with the HVAC shut off, with the HVAC turned on and flowing into the room, or with the HVAC turned on but the diverter 42 directing the air through the exhaust duct 43. All of these are options which may be selected in dependence upon the particular utilization to which the invention is to be put.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. Apparatus for cleansing air, comprising:

a selectively operable electrostatic precipitator having a collector plate comprising a material which absorbs significant microwave radiation;

a selectively operable microwave source means for directing microwave radiation to said collector plate;

air flow means for providing a flow of air to be cleansed through said electrostatic precipitator; and a controller for operating said electrostatic precipitator so as to collect particles entrained in said flow of air during a first period of time and for operating said microwave source means during a second period of time following said first period of time.

2. Apparatus according to claim 1 wherein said collector plate comprises a substrate coated with an electrically conductive, microwave absorptive material.

3. Apparatus according to claim 2 wherein said material comprises titanium nitride.

4. Apparatus according to claim 2 wherein said material comprises zirconium diboride.

5. Apparatus according to claim 2 wherein said material comprises chemical vapor deposition silicon carbide.

6. Apparatus according to claim 2 wherein said substrate comprises reticulated silicon carbide.

7. Apparatus according to claim 1 wherein said electrostatic precipitator includes:

a plurality of collector plates; and a plurality of deflector plates, disposed adjacent said collector plates.

8. Apparatus according to claim 7 wherein said plates are disposed at an angle with respect to incident radiation from said source means, whereby radiation is reflected from said deflector plates onto said collector plates.

9. Apparatus according to claim 1 wherein said collector plate is reticulated and disposed normal to the said flow of air.

10. Apparatus according to claim 1 wherein said collector plate is disposed parallel to said flow of air.

11. Apparatus according to claim 1 wherein said microwave source means directs pulses of microwave radiation to said collector plate.

12. Apparatus according to claim 1 wherein said collector plate comprises reticulated chemical vapor deposited silicon carbide.

* * * * *